(12) United States Patent
Won

(10) Patent No.: US 12,401,723 B2
(45) Date of Patent: Aug. 26, 2025

(54) METHOD AND APPARATUS FOR ACHIEVING NAS SIGNALING VIA OTHER ACCESS

(71) Applicant: NOKIA TECHNOLOGIES OY, Espoo (FI)

(72) Inventor: Sung Hwan Won, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 544 days.

(21) Appl. No.: 17/430,908

(22) PCT Filed: Feb. 18, 2019

(86) PCT No.: PCT/EP2019/054004
§ 371 (c)(1),
(2) Date: Aug. 13, 2021

(87) PCT Pub. No.: WO2020/169177
PCT Pub. Date: Aug. 27, 2020

(65) Prior Publication Data
US 2022/0053056 A1    Feb. 17, 2022

(51) Int. Cl.
*H04L 29/08*  (2006.01)
*H04L 67/14*  (2022.01)
*H04W 76/27*  (2018.01)

(52) U.S. Cl.
CPC .......... *H04L 67/14* (2013.01); *H04W 76/27* (2018.02)

(58) Field of Classification Search
CPC ...... H04L 67/14; H04W 76/27; H04W 76/12; H04W 76/22; H04W 76/32; H04W 76/18; H04W 12/06
(Continued)

(56) References Cited

U.S. PATENT DOCUMENTS

2010/0167762 A1   7/2010   Pandey et al.
2019/0254089 A1*  8/2019   Huang-Fu ............. H04W 76/12
(Continued)

FOREIGN PATENT DOCUMENTS

CN   108400997 A   8/2018
CN   108696855 A   10/2018
(Continued)

OTHER PUBLICATIONS

International Search Report and Written Opinion dated Sep. 25, 2019 corresponding to International Patent Application No. PCT/EP2019/054004.
(Continued)

*Primary Examiner* — Candal Elpenord
(74) *Attorney, Agent, or Firm* — SQUIRE PATTON BOGGS (US) LLP

(57) ABSTRACT

In a device, there is provided a session management sublayer management and a mobility management sublayer. A session management message for managing a session according to a second standard is received at the device via communications according to a first standard. The mobility management sublayer provides to the session management sublayer an indication that the message was received according to the first standard. The session management sublayer provides an indication to the mobility management sublayer that a responsive session management message also associated with the session according to the second standard should be transmitted via communications according to the first standard.

15 Claims, 14 Drawing Sheets

(58) Field of Classification Search
USPC .................................................. 370/328–330
See application file for complete search history.

(56) References Cited

U.S. PATENT DOCUMENTS

| | | | |
|---|---|---|---|
| 2019/0274185 A1* | 9/2019 | Stojanovski | ........ H04L 47/2441 |
| 2022/0132455 A1* | 4/2022 | Gupta | ................... H04W 60/00 |
| 2022/0167446 A1* | 5/2022 | Youn | ..................... H04W 48/18 |

FOREIGN PATENT DOCUMENTS

| | | |
|---|---|---|
| EP | 2 418 815 A1 | 2/2012 |
| WO | 2018/034337 A1 | 2/2018 |

OTHER PUBLICATIONS

3GPP TS 24.501 V15.2.1 (Jan. 2019), Technical Specification, 3rd Generation Partnership Project; Technical Specification Group Core Network and Terminals; Non-Access-Stratum (NAS) protocol for 5G System (5GS); Stage 3 (Release 15), Jan. 7, 2019, XP051686626.
Nokia et al., "SMS transport over NAS," 3GPP Draft; C1-173768, 3GPP TSG-CT WG1 Meeting #105, Krakow, Poland, Aug. 25, 2017, XP051327406.
Huawei et al., "Correction to Configured NSSAI for the HPLMN," 3GPP Draft; C1-186823, 3GPP TSG-CT WG1 Meeting #112bis, Vilnius, Lithuania, Dec. 9, 2018, XP051546992.
3GPP TR 38.913 V15.0.0 (Jun. 2018), Technical Report, 3rd Generation Partnership Project; Technical Specification Group Radio Access Network; Study on Scenarios and Requirements for Next Generation Access Technologies (Release 15), Jun. 2018.
First Examination Report dated Mar. 7, 2022 corresponding to Indian Patent Application No. 202117027858.
First Office Action dated Dec. 26, 2023 corresponding to Chinese Patent Application No. 201980092226.X, with English summary thereof.
Communication pursuant to Article 94(3) EPC dated Jun. 25, 2024 issued in corresponding European Patent Application No. 19 706 548.5.

* cited by examiner

METHOD AND APPARATUS FOR ACHIEVING NAS SIGNALING VIA OTHER ACCESS

FIELD OF THE INVENTION

This disclosure relates to a method and system, and in particular, but not exclusively, to a method and system for handling service management messages.

BACKGROUND

A communication system can be seen as a facility that enables communication between two or more devices such as user terminals, machine-like terminals, base stations and/or other nodes by providing carriers between the communication devices. A communication system can be provided, for example, by means of a communication network and one or more compatible communication devices. The communication may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

SUMMARY

According to first aspect, there is provided an apparatus comprising means for: providing a first protocol sublayer configured to provide mobility management services; and providing a second protocol sublayer configured to provide session management services; receiving a session management message from a network side apparatus, wherein the session management message is delivered according to a first at least one protocol, wherein the session management message is a message for managing a communication session according to a second at least one protocol, wherein the first protocol sublayer is configured to provide to the second protocol sublayer, an indication that the session management message was delivered according to the first at least one protocol, wherein the second protocol sublayer is configured to, responsive to the indication that the session management was delivered according to the first at least one protocol, provide to the first protocol sublayer, an indication that a responsive session management message is to be transmitted according to the first at least one protocol, wherein the first protocol sublayer is configured to, responsive to the indication that the responsive session management message is to be transmitted according to the first at least one protocol, cause the responsive session management message to be transmitted according to the first at least one protocol to the network side apparatus.

In some examples, the first at least one protocol is a set of protocols according to a first standard, wherein the second at least one protocol is a set of protocols according to a second standard.

In some examples, the first protocol sublayer is configured to provide to the second protocol sublayer, the session management message.

In some examples, the second protocol sublayer is configured to construct, in dependence upon the session management message, the responsive session management message.

In some examples, the second protocol sublayer is configured to provide to the first protocol sublayer, the responsive session management message.

In some examples, the session management message comprises at least one of: a message for authenticating a device participating in the communication session; a message for indicating a modification of the communication session; and a message for indicating a release of the communication session.

In some examples, the responsive session management message comprises at least one of: a message indicating acceptance of the message for authenticating the device participating in the communication session; a message indicating acceptance of the message for indicating modification of the communication session; and a message indicating acceptance of the release of the communication session as indicating in the message for indicating the release of the communication session.

In some examples, the receiving the session management message from the network side apparatus comprises receiving at the first at least one protocol layer, a mobility management message comprising the session management message.

In some embodiments, the first protocol sublayer is configured to determine from a mobility management header of the mobility management message that the session management message was delivered according to the first at least one protocol.

In some examples, the causing the responsive session management message to be transmitted according to the first at least one protocol to the network side apparatus comprises causing a mobility management message comprising the responsive session management message to be transmitted to the network side apparatus.

In some examples, the second protocol sublayer comprises at least one of: a session management sublayer; a short message control protocol layer; and a long-term evolution positioning protocol layer.

In some examples, when the session management message is received from the network side apparatus, the apparatus is operating in an idle mode with respect to the communications according to the second at least one protocol.

According to second aspect, there is provided a method comprising: providing a first protocol sublayer configured to provide mobility management services; and providing a second protocol sublayer configured to provide session management services; receiving a session management message from a network side apparatus, wherein the session management message is delivered according to a first at least one protocol, wherein the session management message is a message for managing a communication session according to a second at least one protocol, wherein the first protocol sublayer is configured to provide to the second protocol sublayer, an indication that the session management message was delivered according to the first at least one protocol, wherein the second protocol sublayer is configured to, responsive to the indication that the session management was delivered according to the first at least one protocol, provide to the first protocol sublayer, an indication that a responsive session management message is to be transmitted according to the first at least one protocol, wherein the first protocol sublayer is configured to, responsive to the indication that the responsive session management message is to be transmitted according to the first at least one protocol, cause the responsive session management message to be transmitted according to the first at least one protocol to the network side apparatus.

In some examples, the first at least one protocol is a set of protocols according to a first standard, wherein the second at least one protocol is a set of protocols according to a second standard.

In some examples, the first protocol sublayer is configured to provide to the second protocol sublayer, the session management message.

In some examples, the second protocol sublayer is configured to construct, in dependence upon the session management message, the responsive session management message.

In some examples, the second protocol sublayer is configured to provide to the first protocol sublayer, the responsive session management message.

In some examples, the session management message comprises at least one of: a message for authenticating a device participating in the communication session; a message for indicating a modification of the communication session; and a message for indicating a release of the communication session.

In some examples, the responsive session management message comprises at least one of: a message indicating acceptance of the message for authenticating the device participating in the communication session; a message indicating acceptance of the message for indicating modification of the communication session; and a message indicating acceptance of the release of the communication session as indicating in the message for indicating the release of the communication session.

In some examples, the receiving the session management message from the network side apparatus comprises receiving at the first at least one protocol layer, a mobility management message comprising the session management message.

In some embodiments, the first protocol sublayer is configured to determine from a mobility management header of the mobility management message that the session management message was delivered according to the first at least one protocol.

In some examples, the causing the responsive session management message to be transmitted according to the first at least one protocol to the network side apparatus comprises causing a mobility management message comprising the responsive session management message to be transmitted to the network side apparatus.

In some examples, the second protocol sublayer comprises at least one of: a session management sublayer; a short message control protocol layer; and a long-term evolution positioning protocol layer.

In some examples, when the session management message is received from the network side apparatus, the apparatus is operating in an idle mode with respect to the communications according to the second at least one protocol.

According to a third aspect, there is provided computer program comprising instructions for causing an apparatus to perform at least: providing a first protocol sublayer configured to provide mobility management services; and providing a second protocol sublayer configured to provide session management services; receiving a session management message from a network side apparatus, wherein the session management message is delivered according to a first at least one protocol, wherein the session management message is a message for managing a communication session according to a second at least one protocol, wherein the first protocol sublayer is configured to provide to the second protocol sublayer, an indication that the session management message was delivered according to the first at least one protocol, wherein the second protocol sublayer is configured to, responsive to the indication that the session management was delivered according to the first at least one protocol, provide to the first protocol sublayer, an indication that a responsive session management message is to be transmitted according to the first at least one protocol, wherein the first protocol sublayer is configured to, responsive to the indication that the responsive session management message is to be transmitted according to the first at least one protocol, cause the responsive session management message to be transmitted according to the first at least one protocol to the network side apparatus.

In some examples, the first at least one protocol is a set of protocols according to a first standard, wherein the second at least one protocol is a set of protocols according to a second standard.

In some examples, the first protocol sublayer is configured to provide to the second protocol sublayer, the session management message.

In some examples, the second protocol sublayer is configured to construct, in dependence upon the session management message, the responsive session management message.

In some examples, the second protocol sublayer is configured to provide to the first protocol sublayer, the responsive session management message.

In some examples, the session management message comprises at least one of: a message for authenticating a device participating in the communication session; a message for indicating a modification of the communication session; and a message for indicating a release of the communication session.

In some examples, the responsive session management message comprises at least one of: a message indicating acceptance of the message for authenticating the device participating in the communication session; a message indicating acceptance of the message for indicating modification of the communication session; and a message indicating acceptance of the release of the communication session as indicating in the message for indicating the release of the communication session.

In some examples, the receiving the session management message from the network side apparatus comprises receiving at the first at least one protocol layer, a mobility management message comprising the session management message.

In some embodiments, the first protocol sublayer is configured to determine from a mobility management header of the mobility management message that the session management message was delivered according to the first at least one protocol.

In some examples, the causing the responsive session management message to be transmitted according to the first at least one protocol to the network side apparatus comprises causing a mobility management message comprising the responsive session management message to be transmitted to the network side apparatus.

In some examples, the second protocol sublayer comprises at least one of: a session management sublayer; a short message control protocol layer; and a long-term evolution positioning protocol layer.

In some examples, when the session management message is received from the network side apparatus, the apparatus is operating in an idle mode with respect to the communications according to the second at least one protocol.

According to an fourth aspect, there is provided a non-transitory computer readable medium comprising program instructions for causing an apparatus to perform at least the following: providing a first protocol sublayer configured to provide mobility management services; and providing a second protocol sublayer configured to provide session management services; receiving a session management message from a network side apparatus, wherein the session management message is delivered according to a first at least one protocol, wherein the session management message is a message for managing a communication session according to a second at least one protocol, wherein the first protocol sublayer is configured to provide to the second protocol sublayer, an indication that the session management message was delivered according to the first at least one protocol, wherein the second protocol sublayer is configured to, responsive to the indication that the session management was delivered according to the first at least one protocol, provide to the first protocol sublayer, an indication that a responsive session management message is to be transmitted according to the first at least one protocol, wherein the first protocol sublayer is configured to, responsive to the indication that the responsive session management message is to be transmitted according to the first at least one protocol, cause the responsive session management message to be transmitted according to the first at least one protocol to the network side apparatus.

In some examples, the first at least one protocol is a set of protocols according to a first standard, wherein the second at least one protocol is a set of protocols according to a second standard.

In some examples, the first protocol sublayer is configured to provide to the second protocol sublayer, the session management message.

In some examples, the second protocol sublayer is configured to construct, in dependence upon the session management message, the responsive session management message.

In some examples, the second protocol sublayer is configured to provide to the first protocol sublayer, the responsive session management message.

In some examples, the session management message comprises at least one of: a message for authenticating a device participating in the communication session;
a message for indicating a modification of the communication session; and a message for indicating a release of the communication session.

In some examples, the responsive session management message comprises at least one of: a message indicating acceptance of the message for authenticating the device participating in the communication session; a message indicating acceptance of the message for indicating modification of the communication session; and a message indicating acceptance of the release of the communication session as indicating in the message for indicating the release of the communication session.

In some examples, the receiving the session management message from the network side apparatus comprises receiving at the first at least one protocol layer, a mobility management message comprising the session management message.

In some embodiments, the first protocol sublayer is configured to determine from a mobility management header of the mobility management message that the session management message was delivered according to the first at least one protocol.

In some examples, the causing the responsive session management message to be transmitted according to the first at least one protocol to the network side apparatus comprises causing a mobility management message comprising the responsive session management message to be transmitted to the network side apparatus.

In some examples, the second protocol sublayer comprises at least one of: a session management sublayer; a short message control protocol layer; and a long-term evolution positioning protocol layer.

In some examples, when the session management message is received from the network side apparatus, the apparatus is operating in an idle mode with respect to the communications according to the second at least one protocol.

According to a fifth aspect, there is provided an apparatus comprising: at least one processor and at least one memory comprising code that, when executed by the at least one processor, causes the apparatus to: provide a first protocol sublayer configured to provide mobility management services; provide a second protocol sublayer configured to provide session management services; and receive a session management message from a network side apparatus, wherein the session management message is delivered according to a first at least one protocol, wherein the session management message is a message for managing a communication session according to a second at least one protocol, wherein the first protocol sublayer is configured to provide to the second protocol sublayer, an indication that the session management message was delivered according to the first at least one protocol, wherein the second protocol sublayer is configured to, responsive to the indication that the session management was delivered according to the first at least one protocol, provide to the first protocol sublayer, an indication that a responsive session management message is to be transmitted according to the first at least one protocol, wherein the first protocol sublayer is configured to, responsive to the indication that the responsive session management message is to be transmitted according to the first at least one protocol, cause the responsive session management message to be transmitted according to the first at least one protocol to the network side apparatus.

In some examples, the first at least one protocol is a set of protocols according to a first standard, wherein the second at least one protocol is a set of protocols according to a second standard.

In some examples, the first protocol sublayer is configured to provide to the second protocol sublayer, the session management message.

In some examples, the second protocol sublayer is configured to construct, in dependence upon the session management message, the responsive session management message.

In some examples, the second protocol sublayer is configured to provide to the first protocol sublayer, the responsive session management message.

In some examples, the session management message comprises at least one of: a message for authenticating a device participating in the communication session; a message for indicating a modification of the communication session; and a message for indicating a release of the communication session.

In some examples, the responsive session management message comprises at least one of: a message indicating acceptance of the message for authenticating the device participating in the communication session; a message indicating acceptance of the message for indicating modification of the communication session; and a message indicating acceptance of the release of the communication session as indicating in the message for indicating the release of the communication session.

In some examples, the receiving the session management message from the network side apparatus comprises receiving at the first at least one protocol layer, a mobility management message comprising the session management message.

In some embodiments, the first protocol sublayer is configured to determine from a mobility management header of the mobility management message that the session management message was delivered according to the first at least one protocol.

In some examples, the causing the responsive session management message to be transmitted according to the first at least one protocol to the network side apparatus comprises causing a mobility management message comprising the responsive session management message to be transmitted to the network side apparatus.

In some examples, the second protocol sublayer comprises at least one of: a session management sublayer; a short message control protocol layer; and a long-term evolution positioning protocol layer.

In some examples, when the session management message is received from the network side apparatus, the apparatus is operating in an idle mode with respect to the communications according to the second at least one protocol.

According to a sixth aspect, there is provided an apparatus comprising: providing circuitry for providing a first protocol sublayer configured to provide mobility management services; providing circuitry for providing a second protocol sublayer configured to provide session management services; and receiving circuitry for receiving a session management message from a network side apparatus, wherein the session management message is delivered according to a first at least one protocol, wherein the session management message is a message for managing a communication session according to a second at least one protocol, wherein the first protocol sublayer is configured to provide to the second protocol sublayer, an indication that the session management message was delivered according to the first at least one protocol, wherein the second protocol sublayer is configured to, responsive to the indication that the session management was delivered according to the first at least one protocol, provide to the first protocol sublayer, an indication that a responsive session management message is to be transmitted according to the first at least one protocol, wherein the first protocol sublayer is configured to, responsive to the indication that the responsive session management message is to be transmitted according to the first at least one protocol, cause the responsive session management message to be transmitted according to the first at least one protocol to the network side apparatus.

In some examples, the first at least one protocol is a set of protocols according to a first standard, wherein the second at least one protocol is a set of protocols according to a second standard.

In some examples, the first protocol sublayer is configured to provide to the second protocol sublayer, the session management message.

In some examples, the second protocol sublayer is configured to construct, in dependence upon the session management message, the responsive session management message.

In some examples, the second protocol sublayer is configured to provide to the first protocol sublayer, the responsive session management message.

In some examples, the session management message comprises at least one of: a message for authenticating a device participating in the communication session; a message for indicating a modification of the communication session; and a message for indicating a release of the communication session.

In some examples, the responsive session management message comprises at least one of: a message indicating acceptance of the message for authenticating the device participating in the communication session; a message indicating acceptance of the message for indicating modification of the communication session; and a message indicating acceptance of the release of the communication session as indicating in the message for indicating the release of the communication session.

In some examples, the receiving the session management message from the network side apparatus comprises receiving at the first at least one protocol layer, a mobility management message comprising the session management message.

In some embodiments, the first protocol sublayer is configured to determine from a mobility management header of the mobility management message that the session management message was delivered according to the first at least one protocol.

In some examples, the causing the responsive session management message to be transmitted according to the first at least one protocol to the network side apparatus comprises causing a mobility management message comprising the responsive session management message to be transmitted to the network side apparatus.

In some examples, the second protocol sublayer comprises at least one of: a session management sublayer; a short message control protocol layer; and a long-term evolution positioning protocol layer.

In some examples, when the session management message is received from the network side apparatus, the apparatus is operating in an idle mode with respect to the communications according to the second at least one protocol.

According to a seventh aspect, there is provided an apparatus configured to perform the actions of any method as described above.

According to an eighth aspect, there is provided a computer program comprising program instructions for causing a computer to perform any method as described above.

According to a ninth aspect, there is provided a computer program product stored on a medium that may cause an apparatus to perform any method as described herein.

According to a tenth aspect, there is provided an electronic device that may comprise apparatus as described herein.

According to an eleventh aspect, there is provided a chipset that may comprise an apparatus as described herein.

FIGURES

Some example embodiments will now be described in further detail, by way of example only, with reference to the following examples and accompanying drawings, in which.

DETAILED DESCRIPTION

Figure 1:
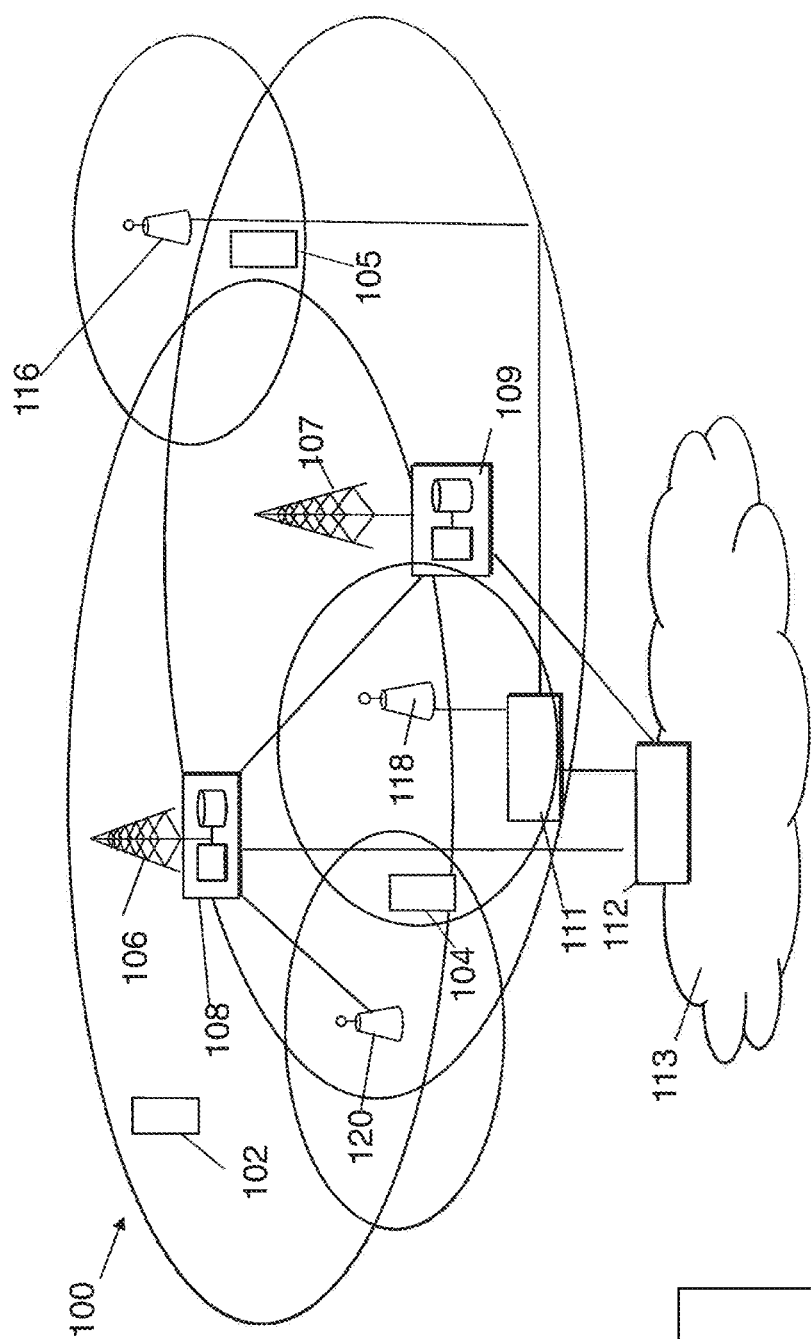
FIG. 1 shows a schematic example of a communication system.

In the following, certain exemplifying embodiments are explained with reference to a wireless communication system serving devices adapted for wireless communication. Before explaining in detail example embodiments, certain general principles of a communication system, a communication device and a control apparatus are briefly explained with reference to FIGS. 1 to 3 to assist in understanding the technology underlying the described invention.

In a wireless system at least a part of the communications between at least two stations occurs over wireless interfaces. Examples of wireless systems include public land mobile networks (PLMN), satellite based communication systems and different wireless local networks, for example, wireless local area networks (WLAN). A local area wireless networking technology allowing devices to connect to a data network is known by the tradename Wi-Fi (or WiFi). Wi-Fi is often used synonymously with WLAN.

Wireless systems can be divided into cells, and are therefore often referred to as cellular systems. A user can access a communication system by means of an appropriate communication device or terminal. A communication device of a user is often referred to as user equipment (UE) or user apparatus. A communication device is provided with an appropriate signal receiving and transmitting apparatus for enabling communications, for example, enabling access to a communication network or enabling communications directly with other users. The communication device may access a carrier provided by a station, for example a base station of a cell, and transmit and/or receive communications on the carrier.

A communication system and associated devices typically operate in accordance with a given standard or specification, which sets out what the various entities associated with the system are permitted to do and how that should be achieved. Communication protocols and/or parameters, which shall be used for the connection are also typically defined. An example of standardized communication system architectures is the long-term evolution (LTE) of the Universal Mobile Telecommunications System (UMTS) radio-access technology. The LTE is being standardized by the 3rd Generation Partnership Project (3GPP). The LTE employs the Evolved Universal Terrestrial Radio Access Network (E-UTRAN) access. Further development of LTE is sometimes referred to as LTE Advanced (LTE-A). The various development stages of 3GPP specifications are referred to as releases. In this description 3GPP release versions are distinguished by the acronym "Rel-nn".

In addition to LTE evolution, 3GPP has initiated a study item targeting a new radio generation (5G) called new radio (NR). NR does not require backwards compatibility with LTE. Instead, it aims at tight interworking between the RAT (radio access technology) and LTE. An objective of a NR study item is to identify and develop technology components needed for new radio (NR) systems to use any spectrum band ranging at least up to 100 GHz. The aim may be to achieve a single technical framework addressing usage scenarios, requirements and deployment scenarios defined in, for example, TR 38.913. The new radio access technology may be forward compatible to allow specification in two separate phases (Phase I and Phase II).

In a wireless communication system 100, such as that shown in FIG. 1, wireless communication devices, for example, machine-type communications MTC devices 102, 104, 105 are provided wireless access via at least one wireless transmitting and/or receiving wireless infrastructure node or point. Such a node could be, for example, a base station or an eNodeB (eNB), or in a 5G system a Next Generation NodeB (gNB), or other wireless infrastructure node. These nodes will be generally referred to as base stations. Base stations are typically controlled by at least one appropriate controller apparatus, so as to enable operation thereof and management of mobile communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity such as a Radio Network Controller. In FIG. 1 control to apparatus 108 and 109 are shown to control the respective macro level base stations 106 and 107. In some systems, the control apparatus may additionally or alternatively be provided in a radio network controller. Other examples of radio access systems comprise those provided by base stations of systems that are based on technologies such as 5G or new radio, wireless local area network (WLAN) and/or WiMax (Worldwide Interoperability for Microwave Access). A base station can provide coverage for an entire cell or similar radio service area.

In FIG. 1, base stations 106 and 107 are shown as connected to a wider communications network 113 via gateway 112. A further gateway function may be provided to connect to another network.

The smaller base stations 116, 118 and 120 may also be connected to the network 113, for example by a separate gateway function and/or via the controllers of the macro level stations. The base stations 116, 118 and 120 may be pico or femto level base stations or the like. In the example, stations 116 and 118 are connected via a gateway 111, whilst station 120 connects via the controller apparatus 108. In some example embodiments, the smaller stations may not be provided.

Figure 2:
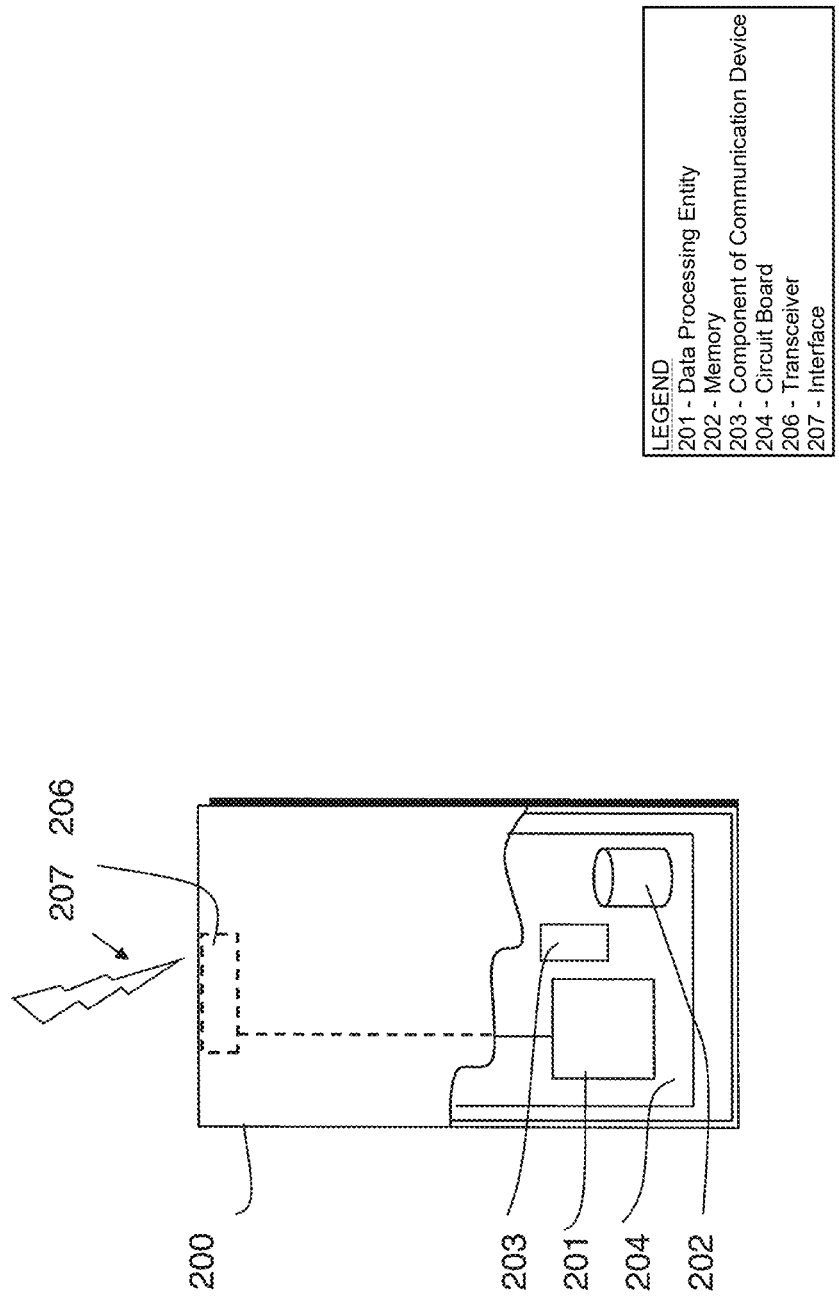
FIG. 2 shows an example of a communication device.

A possible wireless communication device will now be described in more detail with reference to FIG. 2 showing a schematic, partially sectioned view of a communication device 200. Such a communication device 200 is often referred to as an endpoint device. An appropriate communication device 200 may be provided by any device capable of sending and receiving radio signals.

A communication device 200 may be, for example, a mobile device, that is, a device not fixed to a particular location, or it may be a stationary device. The communication device 200 may need human interaction for communication, or may not need human interaction for communication. The communication device 200 may also be referred to hereunder as a terminal, or simply as an apparatus for accessing a network.

The communication device 200 may receive signals over an air or radio interface 207 via appropriate apparatus for receiving and may transmit signals via appropriate apparatus for transmitting radio signals. In FIG. 2, transceiver apparatus is designated schematically by block 206. The transceiver apparatus 206 may be provided for example by means of a radio part and associated antenna arrangement. The antenna arrangement may be arranged internally or externally to the communication device 200.

The communication device 200 is typically provided with at least one data processing entity 201, at least one memory 202 and other possible components 203 for use in the software and hardware aided execution of tasks it is designed to perform, including control of, access to, and communications with, access systems and other communication devices. The data processing, storage and other relevant control apparatus can be provided on an appropriate circuit board and/or in chipsets. This feature is denoted by reference 204. Furthermore, the wireless communication device 200 may comprise appropriate connectors (either wired or wireless) to other devices and/or for connecting external accessories. The communication devices 102, 104, 105 may access the communication system based on various access techniques.

Figure 3:
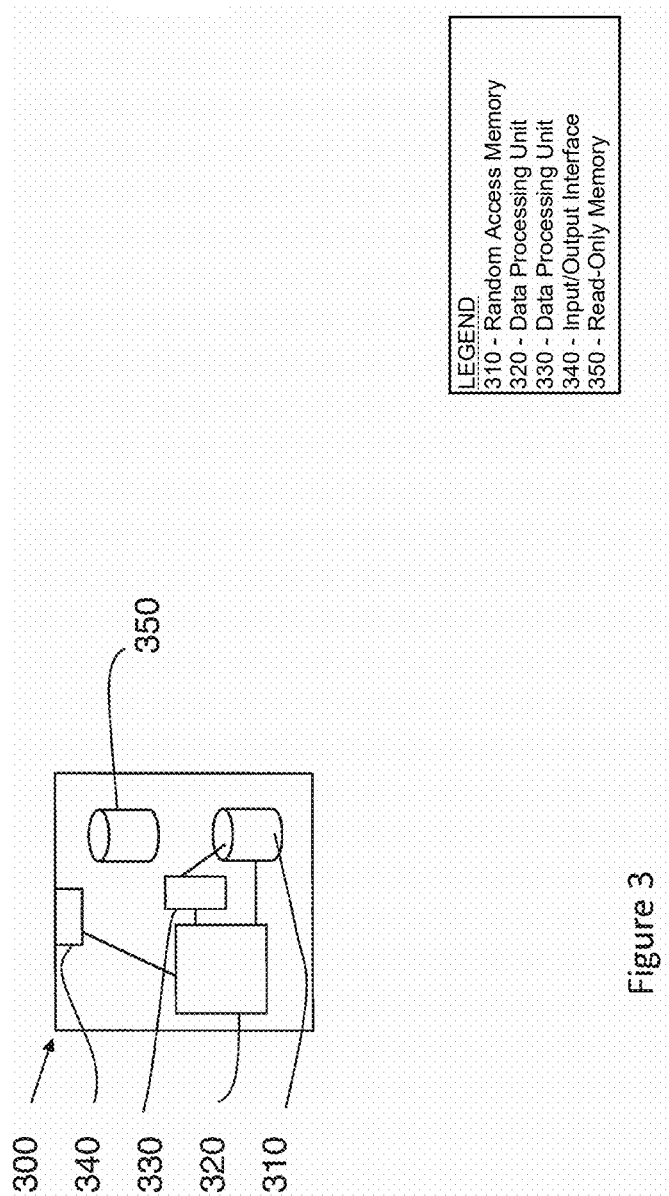
FIG. 3 shows a schematic diagram of an example control apparatus.

FIG. 3 shows an example of a control apparatus 300 for a communication system, for example to be coupled to and/or for controlling a station of an access system, such as a RAN node, e.g. a base station, (e) node B or 5G AP, or a node of a core network such as an MME, S-GW or AMF, or a server or host. The method may be implemented in a single control apparatus or across more than one control apparatus. The control apparatus 300 may be integrated with or external to a node or module of a core network or RAN. In some example embodiments, base stations comprise a separate control apparatus unit or module. In other example embodiments, the control apparatus 300 can be another network element such as a radio network controller or a spectrum controller. In some example embodiments, each base station may have such a control apparatus 300 as well as a control apparatus 300 being provided in a radio network controller. The control apparatus 300 can be arranged to provide control on communications in the service area of the system. The control apparatus 300 comprises at least one random access memory 310, at least one read only memory 350 at least one data processing unit 320, 330 and an input/output interface 340. Via the interface, the control apparatus can be coupled to a receiver and a transmitter of the base station. The receiver and/or the transmitter may be implemented as a radio front end or a remote radio head.

Architectures for wireless communications systems are standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced NodeBs (eNBs) and provide E-UTRAN features such as user plane Packet Data Convergence/Radio Link Control/Medium Access Control/Physical layer protocol (PDCP/RLC/MAC/PHY) and control plane Radio Resource Control (RRC) protocol terminations towards the communication devices. Other examples of radio access system comprise those provided by base stations of systems that are based on technologies such as wireless local area network (WLAN) and/or WiMax (Worldwide Interoperability for Microwave Access). A base station can provide coverage for an entire cell or similar radio service area.

Another example of a 3GPP development is the 5G concept. Network architecture in 5G may be similar to that of the LTE-advanced. Changes to the network architecture may depend on the need to support various radio technologies, provide finer Quality of Service (QoS) support, and meet certain on-demand requirements for example QoS levels to support Quality of Experience (QoE) from a user point of view. Also network aware services and applications, and service and application aware networks may bring changes to the architecture. Those are related to Information Centric Network (ICN) and User-Centric Content Delivery Network (UC-CDN) approaches. 5G may use multiple input-multiple output (MIMO) antennas, many more base stations or nodes than LTE (a so-called small cell concept), including macro sites operating in co-operation with smaller stations and perhaps also employing a variety of radio technologies for better coverage and enhanced data rates.

The base stations/access points in 5G may be referred to as gNB.

The 5G system is planned to be introduced in the early 2020s, enabling expansion of International Mobile Telecommunications (IMT) that go beyond those of IMT-2000 and IMT-Advanced mobile broadband (MBB) service, and also enabling new services and use cases to be addressed. At least during the initial stages of implementation, cells provided by 5G apparatuses may operate using 4G infrastructure, depending on the service being provided. For example, a 5G network connection may be used for improving on a data throughput, relative to 4G, whilst a 4G connection is used for non-data operations, such as control communications between a user equipment and the network. Network cells operating in such a manner, utilising both types of network, are known as non-standalone cells.

Figure 5:
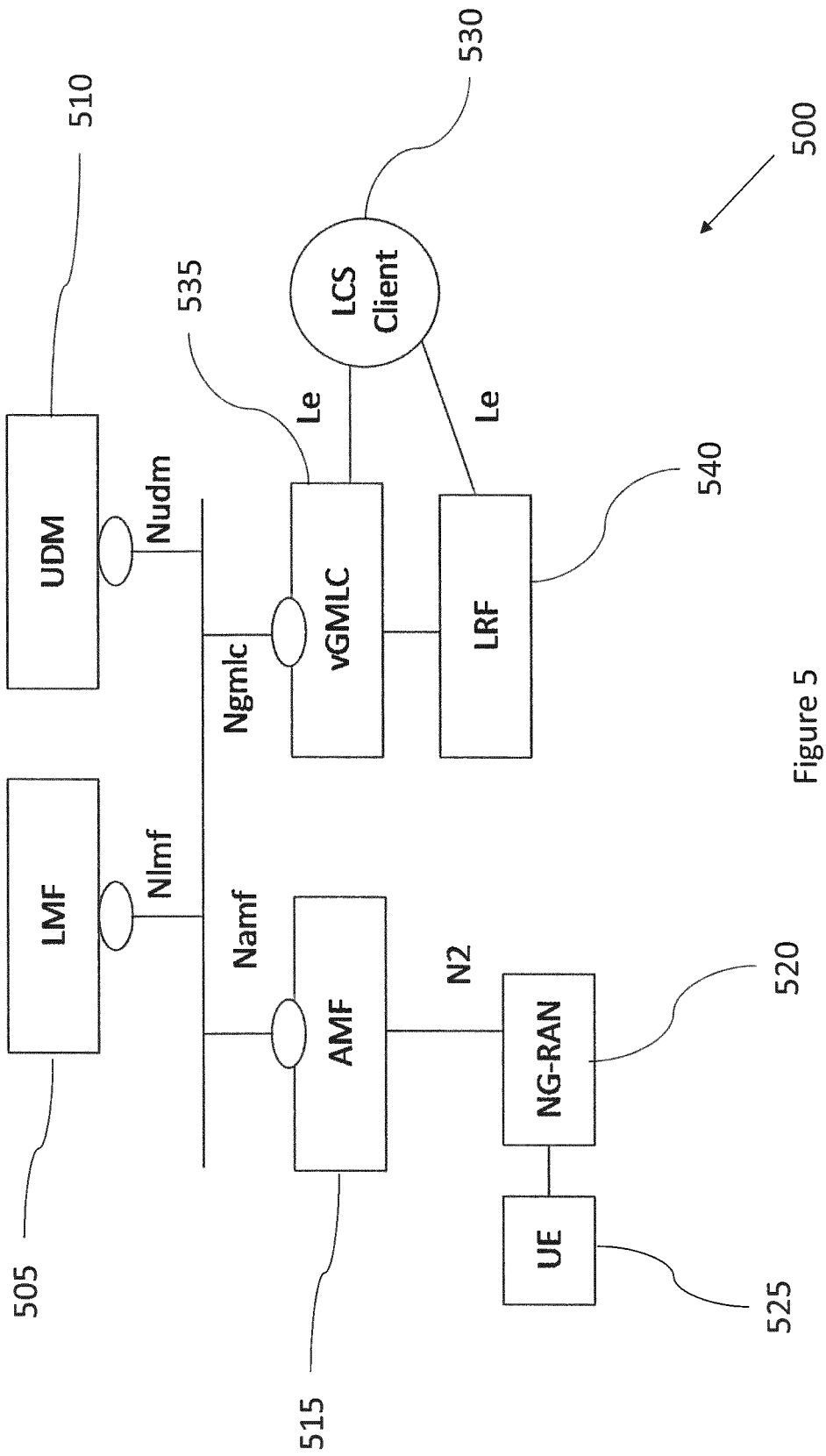
FIG. 5 illustrates an architecture for location services in service based representation.

Reference is made to FIG. 5, which illustrates a non-roaming architecture 500, illustrating various functions that may be provided by a network in addition to the communication devices and their interfaces to the network. Some of these functions may be provided by the core network. Example embodiments of the application may be provided by such a network that provides these functions. Although reference is made here, and elsewhere in the description, to a UE, it would be understood by the skilled person that the device need not be a UE, but may be another type of device.

The Location Management Function (LMF) 505 of the architecture 500 is responsible for supporting location determination for a UE, determining downlink or a location estimate from a UE, obtain location measurements from the radio access network, and obtaining non-UE assistance data from the radio access network. The Unified Data Management (UDM) function 510 of the architecture 500 stores subscription information and supports the Authentication Credential Repository and Processing Function and stores security credentials used for authentication. The access and mobility management function (AMF) 515 is configured to perform a plurality of tasks including: Registration Management, Connection Management, Reachability Management, Mobility Management and various function relating to security and access management and authorization. The AMF 515 provides these services for devices, such as UE 525, configured to communicate with the core The Radio Access Network (shown as NG-RAN) 520 is configured to provide access to the core network for the UE 525. The radio access network 520 comprises one or more base stations and one or more associated radio network controllers.

There is also provided an external client (or location services client) 530 configured to send and receive communications the core network. The Gateway Mobile Location Centre (GMLC) 535 contains functionality required to support Location based services, and therefore, interfaces with the external client 535. The location retrieval function (LRF) 540 can be used for retrieving location information for users that initiated an emergency session.

Figure 6:
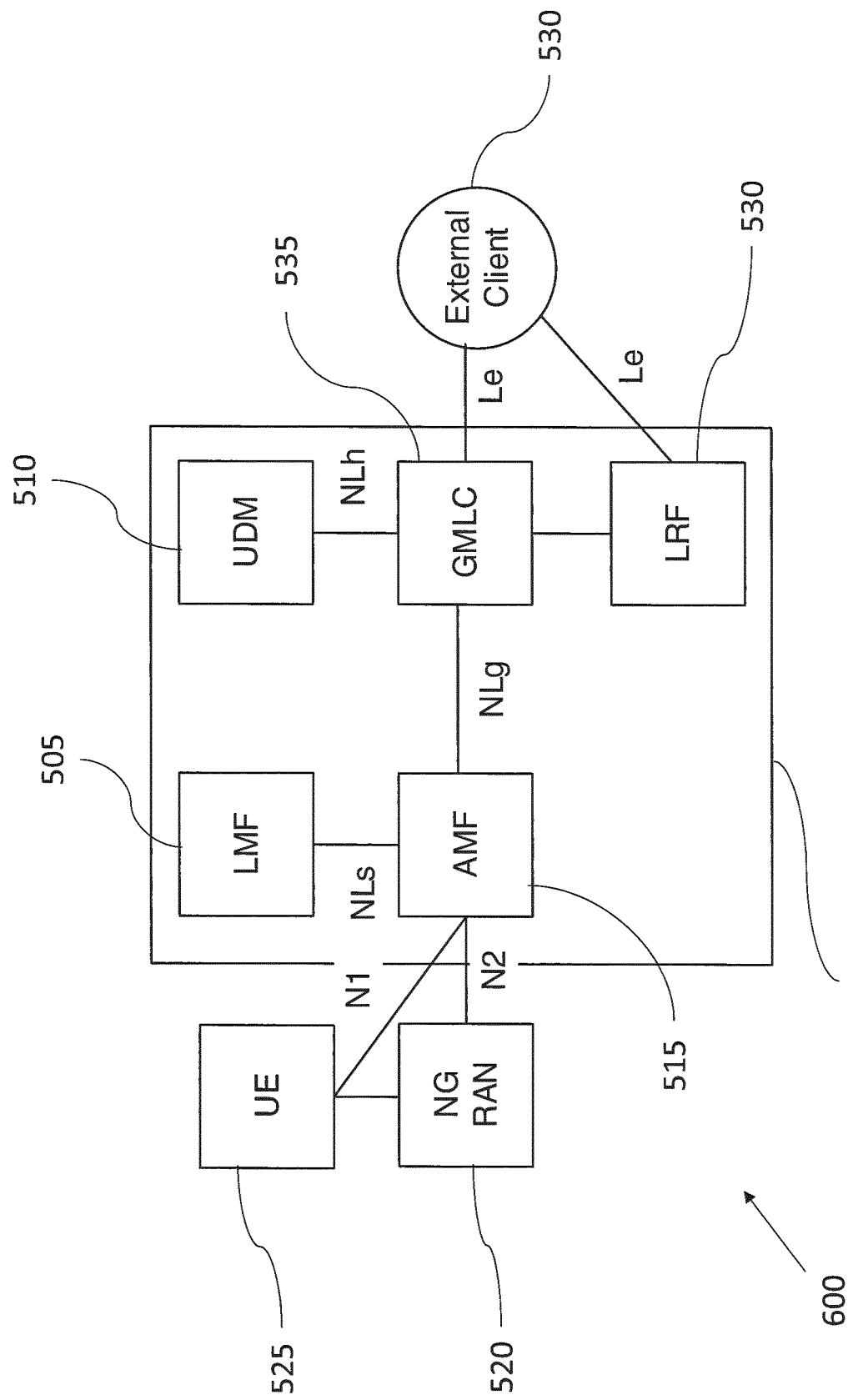
FIG. 6 illustrates an architecture for location services in reference point representation.

Reference is made to FIG. 6, which also illustrates a non-roaming architecture 600. The architecture 600 is illustrated using a reference point representation. This architecture 600 also illustrates how the various network functions interface with each other. In FIGS. 5 and 6, like elements are referred to with like reference numerals. FIG. 6 additionally shows the boundaries of the core network 610.

A device (e.g. a UE) is configured to establish communication sessions with the network side apparatus (e.g. base station and core network). Multiple such communication sessions (referred to as PDU sessions) may be established between the device and the network. Some of these PDU sessions may use different protocols or standards. For example, a first PDU session may involve sending and receiving communications according to a 3GPP standard, such as GERAN, UTRAN, and LTE. A second PDU session may involve sending and receiving communications sent according to a non-3GPP standard, such as Wi-Fi, DSL, and WiMaX.

Figure 7:
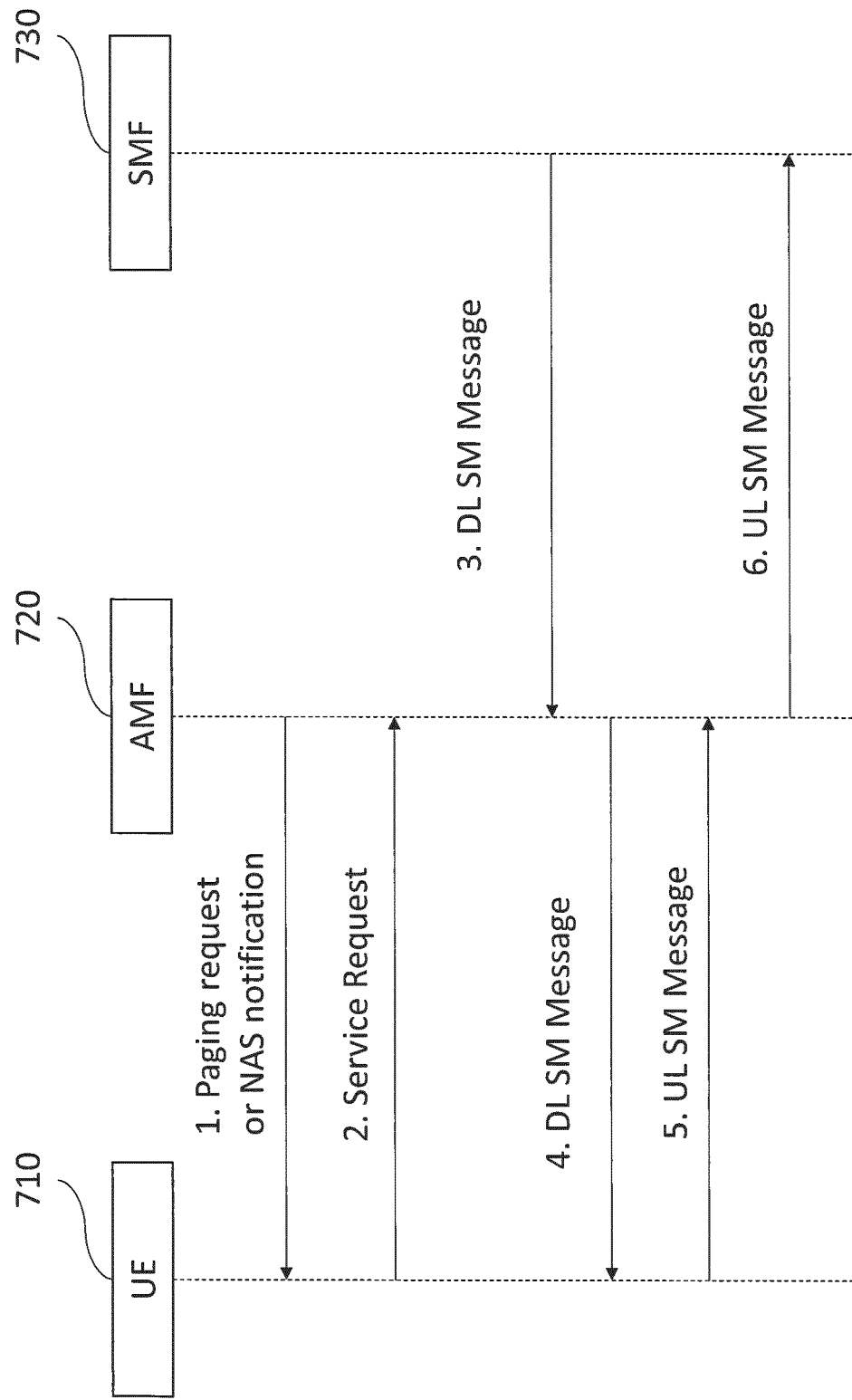
FIG. 7 illustrates a message sequence diagram showing the exchange of messages for performing session management in which the session management is network initiated.

Different types of signalling can be used in order to establish and manage PDU sessions of different protocols. Reference is made to FIG. 7, which illustrates an example of messaging between different network functions and a device 710 for establishing and managing the PDU sessions used by the device 710. The device 710 is in communication with network functions, such as the AMF 720 and the Session Management Function (SMF) 730, of the network side apparatus. The SMF 730 is primarily responsible for interacting with the decoupled data plane; creating, updating and removing Protocol Data Unit (PDU) sessions; and managing session context associated with the User Plane Function (UPF).

In order to initiate the procedure for establishing and managing a PDU session, a network side apparatus sends a paging request or a NAS (non-access stratum) message to the device 710. This message may be sent by the AMF 720 as shown.

In response to receiving the paging request or NAS message, the device 710 transmits a service request to the AMF 720. The service request procedure is used by the device 710 to activate a user plane connection for a particular PDU session.

In response to receiving the service request, the AMF 720 performs authentication procedures and exchanges certain information relating to the PDU session with the SMF 730. This information may indicate whether or not the PDU session can be moved to a different protocol or standard of communication. The SMF 730 receives the information and provides a session management (DL SM Message) message to the AMF 720.

The AMF 720 receives the session management message (DL SM Message) and sends the session management message to the device 710 for establishing or managing the PDU session. The session management message may comprise a PDU session modification command. The session management message may comprise a PDU session authentication command, which is triggered by the SMF 730 if the PDU session has been established by using authentication/authorisation by a DN-AAA server, and which is used to authenticate the device 710. The session management message may comprise a PDU session release command that is triggered by the SMF 730 when the network wants to release the PDU session.

In response to the receipt of the session management message from the AMF 720, the device 710 sends a responsive session management message (UL SM Message) to the AMF 720 to complete the process for establishing or managing the PDU session. The AMF 720 receives this responsive session management message and passes it to the SMF 730.

A device, such as device 710, may be configured to communicate over PDU sessions according to different standards. Each of these standards involves sending and receiving communications according to at least one protocol. For example, the device may be configured to send and receive communications according to a 3GPP standard over a first PDU session. The communications sent and received according to the 3GPP standard may comprise communications sent and received according to at least one of: GSM EDGE Radio Access Network (GERAN), Universal Terrestrial Radio Access Network (UTRAN), Generic Access Network (GAN), Evolved High Speed Packet Access (HSPA Evolution), Evolved Universal Mobile Telecommunications System Terrestrial (EUTRAN), Long Term Evolution (LTE), and New Radio (NR). The device may be configured to send and receive communications according to a non-3GPP standard over a second PDU session. The communications sent and received according to a non-3GPP standard may comprise communications sent and received according to, for example, Wi-Fi, Digital Subscriber Line (DSL), or Worldwide Interoperability for Microwave Access (WiMAx). The 3GPP access type and non-3GPP access type are given as examples of different access types that a PDU session may operate according to.

In some cases, a device may be unable to send and receive communications (e.g. session management messages, user-plane data) according to a certain protocol or standard. This may be a result of the device being in an idle mode for communications according to a particular protocol or standard. For example, the device may be placed in a CM-IDLE (connection management—idle) mode for the communications according to non-3GPP access. In this case, the device is unable to send and receive communications over a PDU session that is associated with non-3GPP communication.

One proposal to handle communications for a PDU session according to a certain protocol or standard when a device is unable to send and receive communications according to the certain protocol or standard is to perform communications for the session via a different protocol or standard, wherein the device is able to send and receive communications according to the different protocol or standard.

For example, if a device is operating in CM-IDLE mode for non-3GPP access communications, when communications for a PDU session for non-3GPP access communications are to be performed, communications for that PDU session may be fulfilled using 3GPP access communications. One proposal to achieve this is that, referring again to FIG. 7, the device 710 may include within the service request, a list of PDU sessions that can be transferred to 3GPP access communications. The AMF 720 will re-activate over 3GPP access, the user plane of the PDU session for which the paging request or NAS notification was sent if the PDU session can be transferred to the 3GPP access. In this example, the protocol or standard associated with the PDU session is completely changed from non-3GPP access to 3GPP access, and subsequent communications can take place for the PDU session over 3GPP access.

Another proposal to allow communication for a non-3GPP PDU session to be fulfilled using 3GPP access communications is that when a PDU session for non-3GPP access communications requires delivery of a DL (downlink) session management message, the DL session management message is sent from the AMF 720 to the device using 3GPP access communications. In this example, the protocol or standard associated with the PDU session is not changed from non-3GPP access to 3GPP access, but only a DL session management message of the PDU session is sent via 3GPP access.

In some cases, however, it may be necessary to, in addition to transmitting a DL session management message via a different protocol to the protocol of the session to which it relates, also transmit a responsive uplink message. There is a problem, therefore, which is how to ensure that such a responsive UL session management message for a PDU session associated with a second at least one protocol (e.g. non-3GPP access) is sent via the first at least one protocol (e.g. 3GPP access) when a DL session management message associated with the PDU session was received at a device via the first at least one protocol.

Example embodiments of the application address this problem by having in the device, a first protocol sublayer configured to provide mobility management services for the device; and a second protocol sublayer configured to provide session management services for the apparatus. The first sublayer may be referred to as a 5G mobility management sublayer (5GMM). The second sublayer may be referred to as a 5G session management sublayer (5GSM). The session management sublayer is ignorant of the access type (i.e. the protocol/standard) by which DL/UL session management messages are transmitted. Furthermore, the mobility management sublayer is ignorant of whether an UL session management message and a DL session management message belong to a single session management procedure. Therefore, according to example embodiments of the application, when sending and receiving session management messages to and from the device, the first and second sublayers are configured to communicate appropriately so as to convey the messages for the PDU session over an allowable communication protocol.

In an example, a session management message (such as DL SM message shown in FIG. 7) is received at the first sublayer from a network side apparatus (e.g. AMF). The session management message is sent to the device according to a first at least one protocol (e.g. a 3GPP set of protocols) by the network side apparatus. The network side apparatus may send the session management message according to the first at least one protocol in response to determining that the device cannot receive communications according to the second at least one protocol (e.g. because it is in an idle mode for the second at least one is protocol). The session management message comprises session management information for a PDU session associated with a second at least one protocol.

Since the session management sublayer does not have access to information in the received messages indicating the access type (i.e. the protocol) by which the session management messages are received and transmitted, and since the mobility management sublayer does not have access to information as to whether an UL (uplink) session management message and a DL session management message belong to a single session management procedure, according example embodiments of the application, an exchange of indications between the two sublayers is performed. When a DL session management message is received at the mobility management sublayer, the mobility management sublayer passes an indication to the session management sublayer that a DL session management message for a PDU session associated with the second at least one protocol has been received using communications according to the first at least one protocol. The session management sublayer produces a responsive UL session management message to be sent in response to the DL session management message. The session management sublayer passes an indication to the mobility management sublayer that the responsive session management message for the PDU session associated with the second at least one protocol is to be delivered via communications according to the first at least one protocol. The mobility management sublayer then causes the session management message to be delivered to the network side apparatus using the first at least one protocol.

By providing the indication of the at least one protocol by which the session management message was received to the session management sublayer, the session management sublayer is able to determine that the responsive message should be sent in accordance with the first at least one protocol, even though the session management sublayer is unable to determine from the DL SM message the access type (i.e. protocol/s) by which the DL SM message was transmitted. Furthermore, by providing the indication of the protocol/s by which a responsive session management message should be sent from the session management sublayer to the mobility management sublayer, the responsive session management message for a PDU session associated with a second at least one protocol may be sent using the first at least one protocol, even though the mobility management sublayer is ignorant of whether the DL session management message and the responsive UL (uplink) session management message belong to a single session management procedure.

Example embodiments of the application will now be described in more detail with reference to the Figures.

Throughout the description, the second protocol sublayer, above the first protocol sublayer, is referred to as a session management sublayer. However, the second protocol sublayer could be a short message control protocol (SM-CP) layer, or a long-term evolution positioning protocol (LPP) layer.

Figure 8:
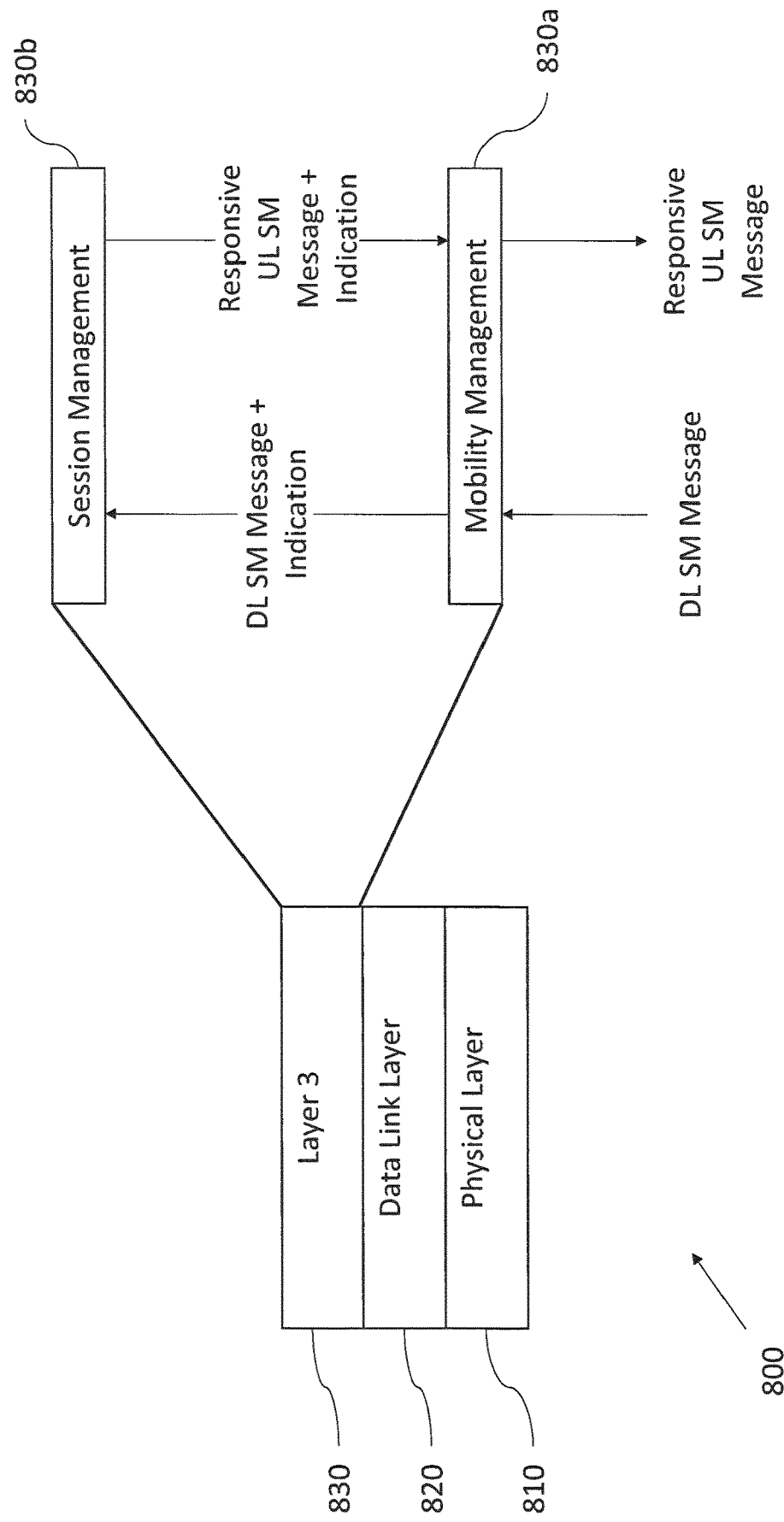
FIG. 8 illustrates a protocol stack implemented in a device for receiving session management messages.

Reference is made to FIG. 8, which illustrates an example of a protocol stack 800 at the device for sending and receiving data according to example embodiments of the application.

The protocol stack 800 includes a physical layer 810. The physical layer provides to the higher level layers, an abstraction of the communications sent and received over the radio interface. The physical layer 810 has several channels to the data link layer 820 on which data can be transmitted.

The protocol stack 800 includes a data link layer 820. The data link layer 820 provides an interface between the physical layer 810 and the layer 3 830. The data link layer 820 provides HARQ feedback and retransmissions for data sent and received at the device. The data link layer 820 also provides segmentation of data. The segmentation allows for the delivery of messages received from the layer 3 830, that are too large to be transmitted in a single packet sent over the air interface, by segmenting them into smaller data units.

The protocol stack 800 includes a layer 3 830 layer. The layer 3 830 layer comprises a plurality of sublayers configured to perform different services.

The sublayers of layer 3 830 shown in FIG. 8 are the session management sublayer 830b and the mobility management sublayer 830a.

The Mobility Management (MM) sublayer 830a provides information to the network as to which cell the device is currently in. It provides several different messages that can be used to update the location information of a device or connect the device initially. The mobility management sublayer 830a provides connection management services. Authentication of the device to the network is also carried out by this sublayer 830a. The mobility management sublayer 830a is configured to determine the at least one protocol by which a received data packet was transmitted to the device.

The session management (SM) sublayer 830b is configured to manage the PDU sessions for the device. Therefore, when a DL session management message is received at the device, this message is passed to the session management sublayer 830b, which is configured to take any appropriate action, including providing a responsive UL session management message to be sent to the network side apparatus.

Layer 3 830 additionally includes further sublayers that are not shown in FIG. 8. The further sublayers include a Radio Resource sublayer. The Radio Resource sublayer is configured to establish and revoke logical channels for communication between the network apparatus and the device.

As noted, the session management sublayer 830b does not normally have access to information as to the access type (i.e. the protocol) by which session management messages are transmitted. However, in the case in which session management messages are sent and received using a communication protocol which differs from the protocol associated with the session to which the message relates, the session management sublayer requires this information so as to instruct the mobility management sublayer 830a to transmit the responsive session management message according to the correct protocol. The mobility management sublayer 830a, which is responsible for connection management, has access to the protocol by which session management messages are received. However, the mobility management sublayer 830a does not contain the information as to whether an UL session management message and a DL session management message belong to a single session management procedure and, therefore, requires this information from the session management sublayer 830b.

When a DL session management message is received as shown in FIG. 8, the DL session management message is passed to the mobility management 830a sublayer. The mobility management sublayer 830a determines the at least one protocol (e.g. 3GPP access or non-3GPP access) that was used for transmission of the DL session management message from the network apparatus. The mobility management sublayer 830a may also determine the PDU session to which the session management message relates. This information may be determined from the PDU session ID that is included in the session management message.

The mobility management sublayer 830a then passes the DL session management message to the session management sublayer 830b along with an indication that the DL session management message was received via the first at least one protocol (e.g. 3GPP access).

The session management sublayer 830b is configured to process the DL session management message. In performing this processing, the session management sublayer 830b produces a responsive uplink session management message. The session management sublayer 830b is configured to provide this UL session management message to the mobility management sublayer 830a along with an indication that the message is to be sent using the first at least one protocol. This indication that the responsive message is to be sent using the first at least one protocol is provided by the session management sublayer 830b in response to the indication that the DL session management message was received via the first at least one protocol. In response to the indication that the responsive message is to be sent using the first at least one protocol, the mobility management sublayer 830a causes the UL session management message to be transmitted to the network apparatus using the first at least one protocol.

In more detail, when exchanging session management messages, the following steps are performed.

1. The SMF creates the session management message for a PDU session associated with the second at least one protocol and encapsulates it.

2. The SMF sends the encapsulated message to the AMF.

3. The AMF parses the encapsulated message and transparently forwards the session management message in a mobility management message (DL NAS TRANSPORT message) via the first at least one protocol.

4. The mobility management sublayer of the device receives the mobility management message via the first at least one protocol. The mobility management sublayer extracts the session management message from the mobility management message. The mobility management sublayer also determines from the mobility management message that it was delivered to the device by communications according to the first at least one protocol. The mobility management sublayer determines this from a mobility management header of the mobility management message. The mobility management sublayer forwards to the session management sublayer, the session management message with an indication that the session management message was received via the first at least one protocol.

5. The session management sublayer of the device creates the responsive session management message (UL NAS TRANSPORT message) and sends it to the mobility management sublayer of the device with an indication that this responsive session management message is to be delivered via the first at least one protocol.

6. The device sends the mobility management message (UL NAS TRANSPORT message) including the responsive session management message via the first at least one protocol to the network side apparatus.

Figure 9:
FIG. 9 illustrates a DL NAS transport message sent from the network to the UE.
Figure 10:
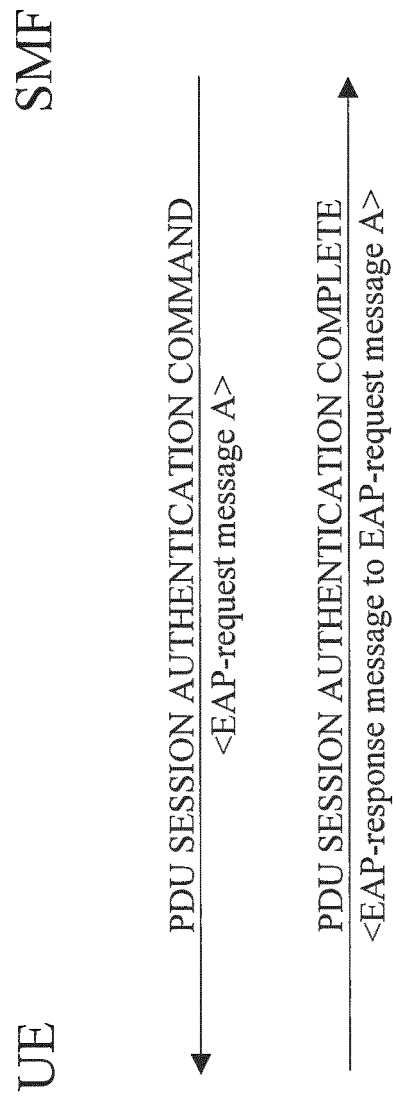
FIG. 10 illustrates PDU session authentication messaging between the network and the UE.
Figure 11:
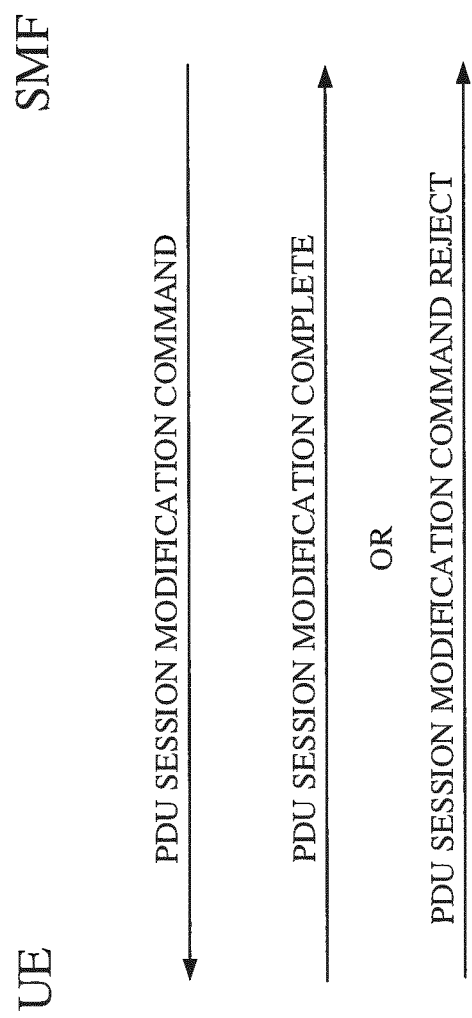
FIG. 11 illustrates PDU session modification messaging between the network and the UE.
Figure 12:
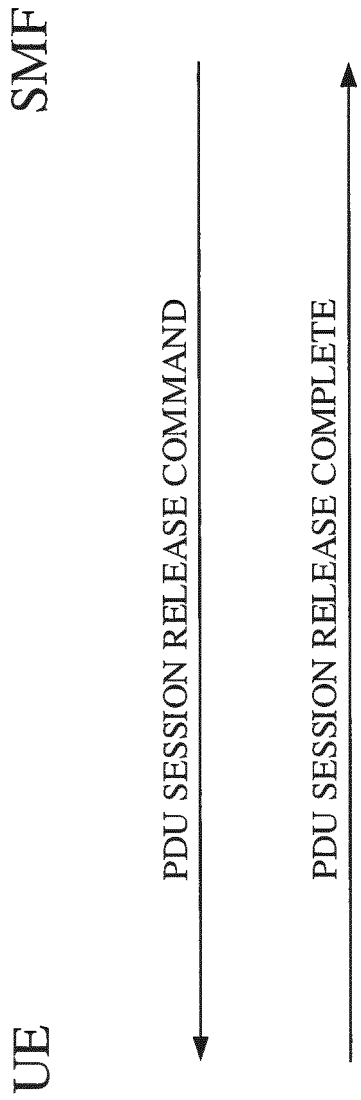
FIG. 12 illustrates PDU session release messaging between the network and the UE.
Figure 13:
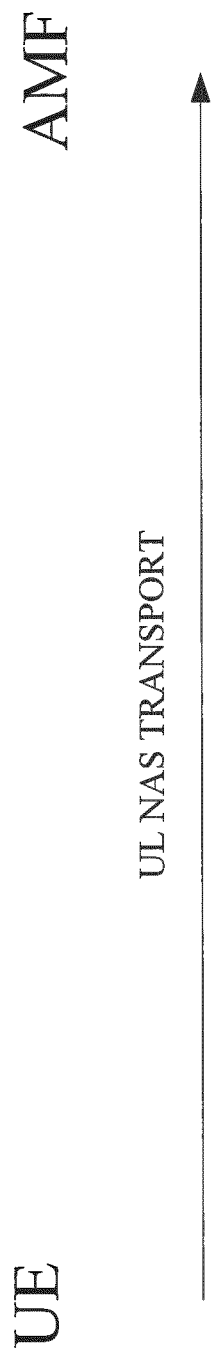
FIG. 13 illustrates an UL NAS transport message sent from the UE to the network.

Reference will now be made to FIGS. 9 to 13. FIGS. 9 and 13 illustrate the NAS transport procedure which is used to deliver session management messages. On the other hand, FIGS. 10 to 12 illustrate specific examples of session management messages.

Reference is made to FIG. 9, which illustrates step 3 above in which the AMF sends the mobility management message containing the session management message to the device. FIG. 9 illustrates a device (labelled as UE) in communication with the AMF in the network side apparatus. The AMF is configured to issue the mobility management message, shown as a DL NAS transport message, to the device. The session management message is an upper layer message with respect to the mobility management message.

Upon reception of the DL NAS TRANSPORT message, if the DL NAS TRANSPORT message is received via 3GPP access and the PDU session ID of the session management message contained therein is associated with non-3GPP access, the mobility management sublayer in the device passes to the session management sublayer, an indication that a session management message for a PDU session associated with non-3GPP access was received via 3GPP access. The mobility management sublayer also passes to the session management sublayer, the session management message itself. The session management sublayer is configured to process the session management message contained in the DL NAS TRANSPORT message in dependence upon the indication that it was received via 3GPP access. The processing comprises generating a responsive session management message to be sent on the uplink.

Reference is made to FIG. 10, which illustrates an example in which the session management message is a PDU SESSION AUTHENTICATION COMMAND. The PDU SESSION AUTHENTICATION COMMAND requests the authentication of a device participating in the relevant PDU session.

FIG. 10 illustrates a device (labelled as UE) in communication with the SMF in the network side apparatus. The SMF is configured to issue the session management message, shown as a PDU SESSION AUTHENTICATION COMMAND, to the device. In response, the device provides a responsive session management message, shown as PDU SESSION AUTHENTICATION COMPLETE, to the SMF. The PDU SESSION AUTHENTICATION COMPLETE message indicates acceptance of the PDU SESSION AUTHENTICATION COMMAND. Therefore, in response to the PDU SESSION AUTHENTICATION COMMAND message, the device transports the PDU SESSION AUTHENTICATION COMPLETE message and the PDU session ID, using the NAS transport procedure.

When the mobility management sublayer in the device receives the PDU SESSION AUTHENTICATION COMMAND message, it provides to the session management sublayer an indication that a session management message for a session associated with non-3GPP access was received via 3GPP access. Since the session management sublayer receives the PDU SESSION AUTHENTICATION COMMAND message with an indication that this message for a PDU session associated with non-3GPP access was received via 3GPP access, the session management sublayer provides the mobility management sublayer with an indication that the corresponding PDU SESSION AUTHENTICATION COMPLETE message is to be delivered via 3GPP access. Accordingly, the mobility management sublayer causes the PDU SESSION AUTHENTICATION COMPLETE message to be transmitted to the network side apparatus via 3GPP access.

Reference is made to FIG. 11, which illustrates an example in which the session management message is a PDU SESSION MODIFICATION COMMAND. The PDU SESSION MODIFICATION COMMAND indicates modification of the PDU session indicated by the PDU session ID contained in the message.

FIG. 11 illustrates a device (labelled as UE) in communication with the SMF in the network side apparatus. The SMF is configured to issue the session management message, shown as PDU SESSION MODIFICATION COMMAND message, to the device. In response, the device provides a responsive session management message to the SMF. The responsive session management message may be a PDU SESSION MODIFICATION COMPLETE message if the device determines to perform the modification to the PDU session. On the other hand, the responsive session management message may be a PDU SESSION MODIFICATION COMMAND REJECT message if the device determines not to perform the modification to the PDU session. The PDU SESSION MODIFICATION COMPLETE message indicates acceptance of the PDU SESSION MODIFICATION COMMAND. On the other hand, the PDU SESSION MODIFICATION COMMAND REJECT message indicates rejection of the PDU SESSION MODIFICATION COMMAND.

Therefore, if the network-requested PDU session modification procedure is accepted by the device, the device shall transport the PDU SESSION MODIFICATION COMPLETE message and the PDU session ID, using the NAS transport procedure. The mobility management sublayer receives the message and provides to the session management sublayer an indication that the session management message for a session associated with non-3GPP access was received via 3GPP access. Since the session management sublayer received the PDU SESSION MODIFICATION COMMAND message with an indication that this message for a PDU session associated with non-3GPP access was received via 3GPP access, the session management sublayer provides the mobility management sublayer with an indication that the corresponding PDU SESSION MODIFICATION COMPLETE message is to be delivered via 3GPP access.

If the network-requested PDU session modification procedure is not accepted by the device, the device shall transport the PDU SESSION MODIFICATION REJECT message and the PDU session ID, using the NAS transport procedure. Since the session management sublayer received the PDU SESSION MODIFICATION COMMAND message with an indication that this message for a PDU session associated with non-3GPP access was received via 3GPP access, the session management sublayer provides the mobility management sublayer with an indication that the corresponding PDU SESSION MODIFICATION REJECT message is to be delivered via 3GPP access.

Reference is made to FIG. 12, in which the session management message is a PDU SESSION RELEASE COMMAND message. The PDU SESSION RELEASE COMMAND message indicates a release of the PDU session indicated by the PDU session ID contained in the message.

FIG. 12 illustrates a device (labelled as UE) in communication with the SMF in the network side apparatus. The SMF is configured to issue the session management message, shown as PDU SESSION RELEASE COMMAND, to the device. In response, the device provides a responsive session management message, shown as PDU SESSION RELEASE COMPLETE, to the SMF. The PDU SESSION RELEASE COMPLETE indicates acceptance of the release of the PDU session as indicated in the PDU SESSION RELEASE COMMAND message. Therefore, in response to the PDU SESSION RELEASE COMMAND message, the device shall transport the PDU SESSION RELEASE COMPLETE message and the PDU session ID, using the NAS transport procedure.

When the mobility management sublayer receives the PDU SESSION RELEASE COMMAND message, it provides to the session management sublayer an indication that a session management message for a session associated with non-3GPP access was received via 3GPP access. The session management sublayer processes the PDU SESSION RELEASE COMMAND message to produce the PDU SESSION RELEASE COMPLETE message. Since the session management sublayer received the PDU SESSION RELEASE COMMAND message with an indication that this message for a PDU session associated with non-3GPP access was received via 3GPP access, the session management sublayer provides the mobility management sublayer with an indication that the corresponding PDU SESSION RELEASE COMPLETE message is to be delivered via 3GPP access.

Reference is made to FIG. 13, which illustrates step 6, discussed above, in which the device sends a mobility management message (UL NAS TRANSPORT Message) containing the responsive session management message to the AMF. FIG. 13 illustrates a device (labelled as UE) in communication with the AMF in the network side apparatus. The device is configured to issue the mobility management message, shown as a UL NAS transport message, to the AMF.

Normally, in the case in which no indication as discussed is provided between the sublayers, the device sends the UL NAS TRANSPORT message to the AMF via the at least one protocol (e.g. either 3GPP access or non-3GPP access) associated with the PDU session ID (which is contained in the session management message). However, according to example embodiments of the application, in the case in which the at least one protocol (e.g. non-3GPP) associated with the PDU session differs from the at least one protocol (e.g. 3GPP) to be used for delivery of the session management message, the session management sublayer provides an indication to the mobility management sublayer that the responsive session management message is to be delivered via the first at least one protocol (e.g. 3GPP access). The session management sublayer also provides to the mobility management sublayer, the responsive session management message itself. Responsive to the indication, the mobility management sublayer produces the UL NAS TRANSPORT message containing the responsive session management message and causes it to be transmitted via 3GPP access to the device.

Figure 14:
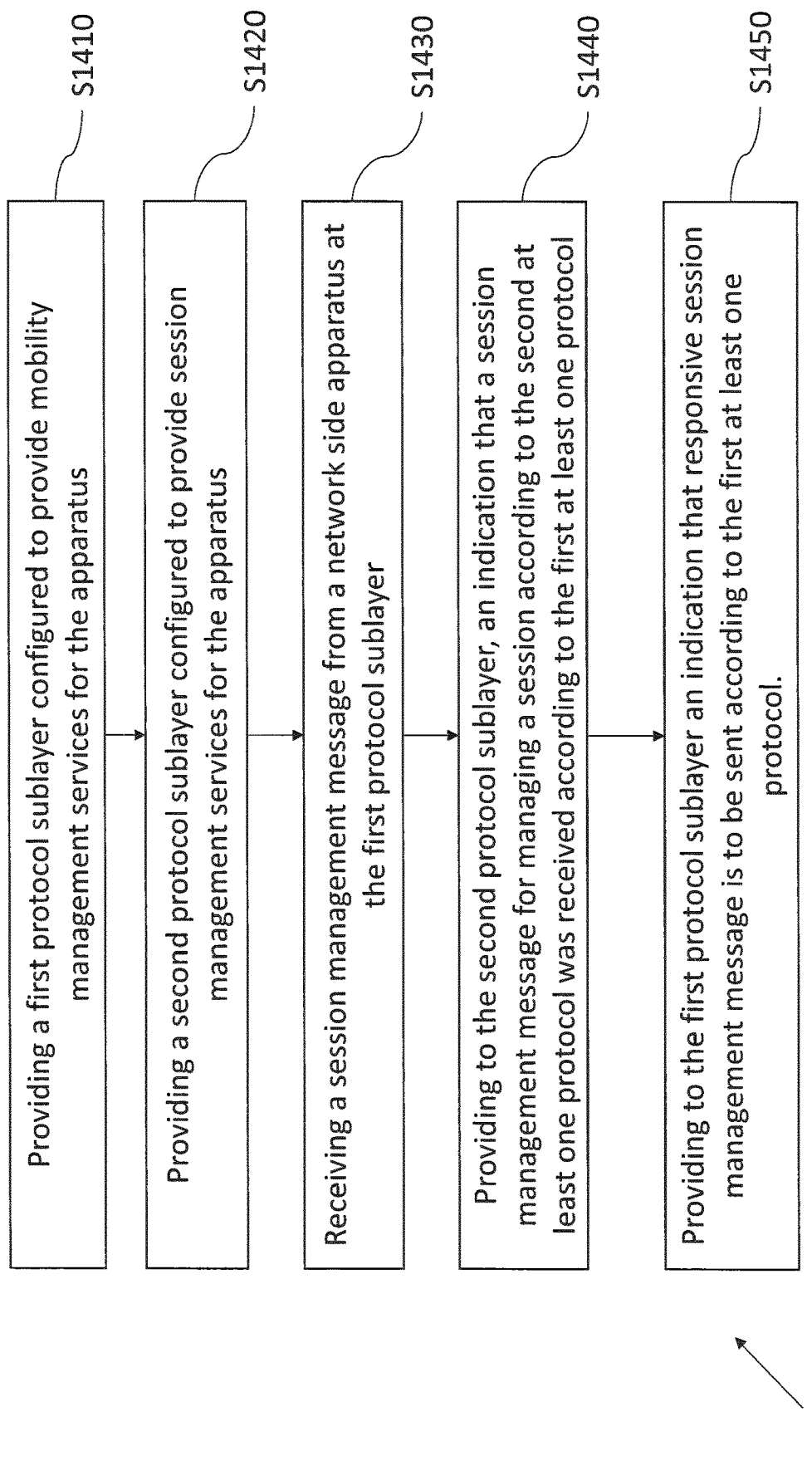
FIG. 14 illustrates a method for sending and receiving session management messages.

Reference is made to FIG. 14, which illustrates a method 1400 implemented in an apparatus/device according to example embodiments of the application. According to this method 1400, the device is configured to receive a network-originated session management message, such as one of the messages illustrated in FIGS. 10 to 12.

At S1410, the device provides a first protocol sublayer for providing mobility management services for the apparatus. This first protocol sublayer is the mobility management sublayer discussed previously.

At S1420, the device provides a second protocol sublayer for providing session management services for the apparatus. This second protocol sublayer is the session management sublayer discussed previously.

At S1430, the device receives a session management message from the network side apparatus. This session management message is delivered to the first protocol sublayer in the apparatus.

At S1440, the first protocol sublayer provides to the second protocol sublayer, an indication that the session management message for managing the session according to the second at least one protocol was received according to the first at least one protocol. The first protocol sublayer may determine this in dependence upon a mobility management header which it removes from the received message prior to passing the session management message to the second protocol sublayer.

At S1450, the second protocol sublayer provides a responsive session management message to the first protocol sublayer. The second protocol sublayer also provides to the first protocol sublayer, an indication that the responsive session management message is to be sent according to the first at least one protocol. The first protocol sublayer will then cause the device to transmit the responsive session management message to the network side apparatus according to the first at least one protocol.

The method of FIG. 14 may be implemented on a mobile device as described with respect to FIG. 2.

It is noted that whilst example embodiments have been described in relation to the first at least one protocol being 3GPP access and the second at least one protocol being non-3GPP access, the invention is not so limited. Furthermore, whilst embodiments have been described in relation to LTE/LTE-A/New Radio, the invention is not limited to these standards. Similar principles can be applied in relation to other standards, networks and communication systems. Therefore, although certain example embodiments were described above by way of example with reference to certain example architectures for wireless networks, technologies and standards, example embodiments may be applied to any other suitable forms of communication systems than those illustrated and described herein.

The system for implementing example embodiments of the application comprises required data processing apparatus and functions that may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory. One or more of the steps discussed in relation to FIG. 14 may be performed by one or more processors in conjunction with one or more memories.

An appropriately adapted computer program code product or products may be used for implementing the example embodiments, when loaded or otherwise provided on an appropriate data processing apparatus. The program code product for providing the operation may be stored on, provided and embodied by means of an appropriate carrier medium. An appropriate computer program can be embodied on a computer readable record medium. A possibility is to download the program code product via a data network. In general, the various example embodiments may be implemented in hardware or special purpose circuits, software, logic or any combination thereof. Example embodiments of the inventions may thus be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Figure 4:
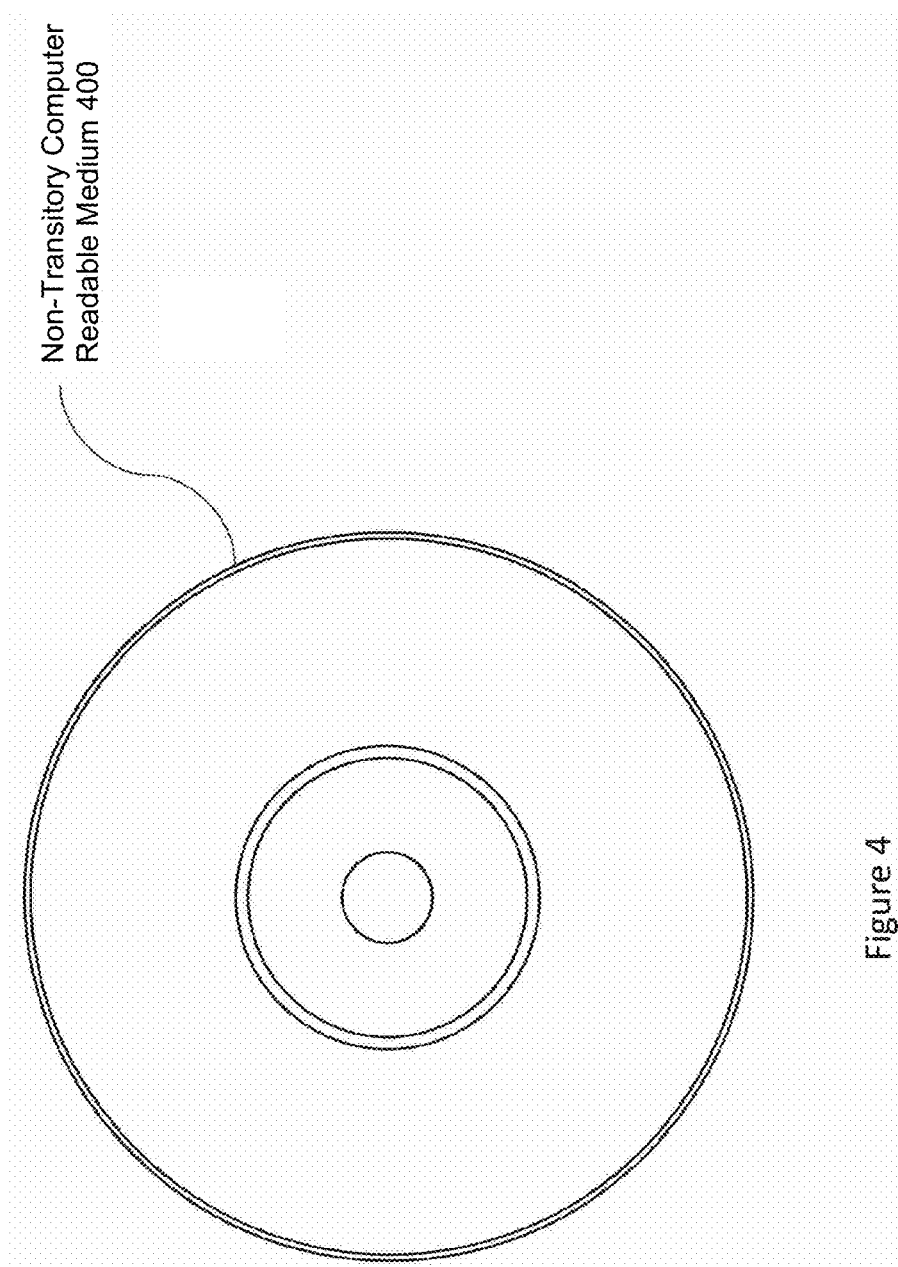
FIG. 4 illustrates an example of a non-transitory computer readable medium.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media. An example of a non-transitory computer readable medium 400 is shown in FIG. 4. The non-transitory computer readable medium 400 may be a CD or DVD.

It is noted that whilst example embodiments have been described in relation to certain architectures, similar principles can be applied to other systems. Therefore, although certain example embodiments were described above by way of example with reference to certain exemplifying architectures for wireless networks, technologies and standards, example embodiments may be applied to any other suitable forms of communication systems than those illustrated and described herein. It is also noted that different combinations of different example embodiments are possible. It is also noted herein that while the above describes exemplifying example embodiments of the invention, there are several variations and modifications which may be made to the disclosed solution without departing from the spirit and scope of the present invention.

The invention claimed is:

1. An apparatus comprising:
   at least one processor; and at least one memory including computer program code, the at least one memory and computer program code being configured, with the at least one processor, to cause the apparatus to perform:
   providing a first protocol sublayer configured to provide mobility management services;
   providing a second protocol sublayer configured to provide session management services; and
   receiving a session management message from a network side apparatus, wherein the session management message is delivered according to a first at least one protocol,
   wherein the session management message comprises a message for managing a communication session according to a second at least one protocol, and
   wherein the first protocol sublayer is configured to cause a responsive session management message associated with the second at least one protocol to be transmitted according to the same protocol by which the session management message was received from the network side apparatus,
   wherein a type of protocol by which the session management message was received determines the type of protocol by which the responsive session management message is to be transmitted, and
   wherein the responsive session management message is transmitted according to the first at least one protocol to the network side apparatus.

2. The apparatus as claimed in claim 1, wherein the first at least one protocol comprises a set of protocols according to a first standard, wherein the second at least one protocol comprises a set of protocols according to a second standard.

3. The apparatus as claimed in claim 1, wherein the first protocol sublayer is configured to provide to the second protocol sublayer, the session management message.

4. The apparatus as claimed in claim 1, wherein the second protocol sublayer is configured to construct, in dependence upon the session management message, the responsive session management message.

5. The apparatus as claimed in claim 1, wherein the second protocol sublayer is configured to provide to the first protocol sublayer, the responsive session management message.

6. The apparatus as claimed in claim 1, wherein the session management message comprises at least one of:
   a message for authenticating a device participating in the communication session;
   a message for indicating a modification of the communication session; and a message for indicating a release of the communication session.

7. The apparatus as claimed in claim 6, wherein the responsive session management message comprises at least one of:
   a message indicating acceptance of the message for authenticating the device participating in the communication session;
   a message indicating acceptance of the message for indicating modification of the communication session; and
   a message indicating acceptance of the release of the communication session as indicating in the message for indicating the release of the communication session.

8. The apparatus as claimed in claim 1, wherein the receiving the session management message from the network side apparatus comprises receiving at the first at least one protocol layer, a mobility management message comprising the session management message.

9. The apparatus as claimed in claim 8, wherein the first protocol sublayer is configured to determine from a mobility management header of the mobility management message, that the session management message was delivered according to the first at least one protocol.

10. The apparatus as claimed in claim 1, wherein the causing the responsive session management message to be transmitted according to the first at least one protocol to the network side apparatus comprises causing a mobility management message comprising the responsive session management message to be transmitted to the network side apparatus.

11. The apparatus as claimed in claim 1, wherein the second protocol sublayer comprises at least one of:
   a session management sublayer;
   a short message control protocol layer; and
   long-term evolution positioning protocol layer.

12. The apparatus as claimed in claim 1, wherein the apparatus is configured to operate in an idle mode with respect to the communications according to the second at least one protocol when the session management message is received from the network side apparatus.

13. The apparatus as claimed in claim 1, wherein the first protocol sublayer is configured to provide to the second protocol sublayer, an indication that the session management message was delivered according to the first at least one protocol,
- wherein the second protocol sublayer is configured to, responsive to the indication that the session management was delivered according to the first at least one protocol, provide to the first protocol sublayer, an indication that the responsive session management message is to be transmitted according to the first at least one protocol, and
- wherein the first protocol sublayer is configured to perform the step of causing the responsive session management message to be transmitted according to the first at least one protocol to the network side apparatus in response to the indication that the responsive session management message is to be transmitted according to the first at least one protocol.

14. A method, comprising:
providing a first protocol sublayer configured to provide mobility management services;
- providing a second protocol sublayer configured to provide session management services; and
- receiving a session management message from a network side apparatus,
- wherein the session management message is delivered according to a first at least one protocol,
- wherein the session management message comprise a message for managing a communication session according to a second at least one protocol, and
- causing a responsive session management message associated with the second at least one protocol to be transmitted according to the same protocol by which the session management message was received from the network side apparatus,
- wherein a type of protocol by which the session management message was received determines the type of protocol by which the responsive session management message is to be transmitted, and
- wherein the responsive session management message is transmitted according to the first at least one protocol to the network side apparatus.

15. A computer program embodied on a non-transitory computer-readable medium, said computer program comprising instructions for causing an apparatus to perform at least:
providing a first protocol sublayer configured to provide mobility management services;
providing a second protocol sublayer configured to provide session management services; and
receiving a session management message from a network side apparatus,
wherein the session management message is delivered according to a first at least one protocol,
wherein the session management message comprises a message for managing a communication session according to a second at least one protocol, and
causing a responsive session management message associated with the second at least one protocol to be transmitted according to the same protocol by which the session management message was received from the network side apparatus,
wherein a type of protocol by which the session management message was received determines the type of protocol by which the responsive session management message is to be transmitted, and
wherein the responsive session management message is transmitted according to the first at least one protocol to the network side apparatus.

* * * * *